United States Patent [19]
Hill

[11] Patent Number: 5,397,992
[45] Date of Patent: Mar. 14, 1995

[54] MEASURING A CIRCUIT DELAY

[75] Inventor: S. Randolph Hill, Aptos, Calif.

[73] Assignee: Sage Instruments, Freedom, Calif.

[21] Appl. No.: 987,090

[22] Filed: Dec. 7, 1992

Related U.S. Application Data

[63] Continuation of Ser. No. 752,242, Aug. 22, 1991, abandoned.

[51] Int. Cl.⁶ .............................................. H04B 1/02
[52] U.S. Cl. ................................. 324/617; 324/621; 379/6; 379/5; 368/120
[58] Field of Search .................... 379/28, 6, 98, 5; 375/9, 10; 455/67, 115; 324/621, 617, 82, 83 R, 85

[56] References Cited

U.S. PATENT DOCUMENTS

| | | | |
|---|---|---|---|
| 2,970,258 | 1/1961 | Sinclair | 324/603 |
| 3,466,652 | 9/1969 | Heyser | 455/67 |
| 3,492,579 | 1/1970 | Carassa | 455/67 |
| 3,769,585 | 10/1973 | Fremouw | 324/82 |
| 4,028,625 | 6/1977 | Behrend | 455/115 |
| 4,245,320 | 1/1981 | Desblanche | 324/621 |
| 4,363,131 | 12/1982 | Froese | 455/67 |
| 4,365,346 | 12/1982 | Froese | 455/67 |

OTHER PUBLICATIONS

"The ABCs of Fault Locating", Telephone Engineer & Management, Oct. 1, 1981 (2 pages).

Primary Examiner—Kenneth A. Wieder
Assistant Examiner—Jose M. Solis
Attorney, Agent, or Firm—Skjerven, Morrill, MacPherson, Franklin & Friel

[57] ABSTRACT

Round trip absolute delays through a transmission system are measured. A modulation signal S1 of radian frequency $\omega$ is modulated onto a carrier. The modulation frequency is changed. While the change propagates through the system, the returned demodulated S2 signal remains at the old radian frequency $\omega$. During that time, signal S1 advances in phase relative to signal S2. After the propagation time d which is equal to the network delay, the two signals stabilize at a fixed phase offset. The increase $\theta_o$ in the phase offset during the propagation time is determined. The delay d is then determined by dividing the phase offset increase $\theta_o$ by the difference between the two modulation frequencies.

7 Claims, 5 Drawing Sheets

MEASURING A CIRCUIT DELAY

This application is a continuation of application Ser. No. 07/752,242, filed Aug. 22, 1991, now abandoned.

BACKGROUND OF THE INVENTION

This invention relates to signals, and more particularly to measuring delays of circuits that transmit signals.

Circuit delay measurements are widely used to troubleshoot and characterize transmission systems. An example of such a circuit is telephone network 110 in FIG. 1. Network 110 transmits voice and data signals between transmitters/receivers 112 and 114. The signals from transmitter/receiver 112 are transmitted through channel 120 ("transmit channel"). The signals from transmitter/receiver 2 are transmitted to transmitter/receiver 112 through channel 122 ("receive channel"). The delay of a channel or a network is the time that it takes the signal to propagate through the channel or the network. Delays in a typical network vary from near zero to about 1.2 seconds depending on the network complexity and the distances involved.

The delay is measured and compared to its normal value during troubleshooting. The delay measurement helps characterize the system. For example, the delay measurement helps determine the need for an echo canceler. Namely, part of the signal transmitted on transmit channel 120 is reflected back to transmitter/receiver 112. If transmitter/receiver 112 is a telephone set, the person speaking on the telephone hears the reflected signal as an echo. If the echo is delayed by 10 milliseconds or more, the person hears the echo as distinct from his own voice. The echo can be annoying. Echo cancelers are circuits that eliminate echoes. The circuit designer determines from delays of the network or its components whether an echo canceler is needed.

FIG. 2 illustrates how the "round trip" delay through a network is measured. Signal generator 210 sends a signal through transmit channel 120. The signal typically has a carrier frequency of 300 Hz to 3004 Hz, which is an appropriate range for voice and data signals. The carrier is modulated at $f_m=83.33$ Hz. At the other end 220, the signal is looped back and returned on receive channel 122. The time from sending the signal 410 and receiving it back on channel 122 is measured, providing the round trip delay through network 110.

Direct time measurements are typically imprecise and thus often inadequate. More precise delay values are obtained by comparing the phases of the respective modulation components signals. FIG. 3 illustrates this technique. FIG. 3(a) is a diagram of the modulation component of the signal from generator 210. FIG. 4(b) is a diagram of the modulation component of the returned signal. The time is measured along the horizontal axis, and the amplitude is measured along the vertical axis. Both components have a frequency of 83.33 Hz. The phase offset is shown as $\theta_o$. The delay d is then computed from the formula $$d = \theta_o / \omega_m$$

where $\omega_m = f_m \times 2\pi$ is the radian frequency of the components.

Since the phase offset $\theta_o$ can be measured only up to 360° ($2\pi$ radians), the maximum delay d that can be measured is the period of the $f_m$ signal. At $f_m=83.33$ Hz, the period is 12 milliseconds. The 12 millisecond maximum, however, is unacceptable for many networks. Delays in networks with satellite links often reach and exceed 1,200 milliseconds. In order to measure delays up to 1,200 milliseconds, frequency $f_m$ must be reduced 100 times to below 1 Hz. However, the measurements at such low frequencies take a long time to perform.

Thus there is a need for a technique that would allow to measure delays of over 1 second both precisely and fast.

SUMMARY OF THE INVENTION

The present invention allows the measurement of large delays precisely and fast. In one embodiment, the technique utilizes phase comparison of signals having frequencies near 83.33 Hz signals. The technique is thus precise and fast.

In one embodiment, the technique includes varying the frequency $f_m$ of the transmitted signal and measuring the round trip delay of the propagation of the frequency change. This propagation delay is equal to the round trip delay d of the network. In one example, the frequency $f_m$ is initially set to $f_{m,1}=83.33$ Hz. The returned signal has the same frequency. Then the transmitted signal frequency is increased by $f_{m,i}=0.833$ Hz, that is by 1% of the original frequency $f_{m,1}$. The transmitted signal frequency becomes $f_{m,2}=f_{m,1}+f_{m,i}=84.166$ Hz. The frequency of the returned signal remains at 83.33 Hz while the new frequency propagates through the network. Meanwhile, the phase difference between the transmitted and the returned signals increases at $f_{m,i}$ cycles per second. After delay d, the frequency change propagates through the network, and the returned signal frequency becomes $f_{m,2}$. The phase offset is then measured between the two signals, and the additional phase offset that took place during the frequency change propagation is determined. This phase offset $\theta_o$ is used to determine the delay d. Namely, since the additional offset reached the value of $\theta_o$ radians during time d at the rate of $f_{m,i}$ cycles per second, $$d = \theta_o / \omega_i$$

where $\omega_i$ is the radian frequency corresponding to frequency $f_{m,i}$.

The maximum delay d corresponds to the period of the signal with frequency $f_{m,i}$. Since $f_{m,i}$ is 1% of $f_{m,1}=83.33$ Hz, the period is $100 \times 12$ ms = 1,200 milliseconds. Thus the maximum delay value is 1,200 milliseconds.

In some variations, frequency $f_m$ is decreased, rather than increased, by $f_{m,i}$. The delay d is computed similarly. Other values of $f_{m,1}$ and $f_{m,i}$ are used in other embodiments to achieve other maximum values of delay d and to vary the measurement resolution.

Other features of the invention are described below. The invention is defined by the appended claims.

DESCRIPTION OF THE PREFERRED EMBODIMENTS

Figure 1:
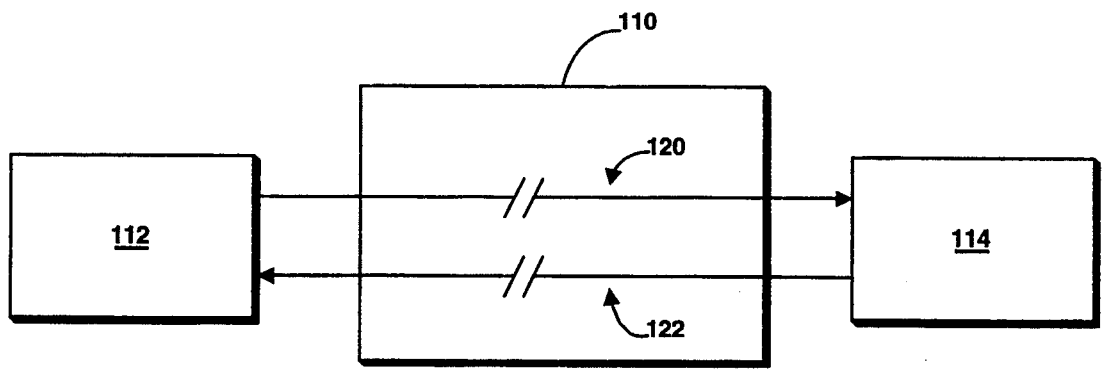
FIG. 1 is a block diagram of a system in which delays can be measured by techniques of this invention.
Figure 2:
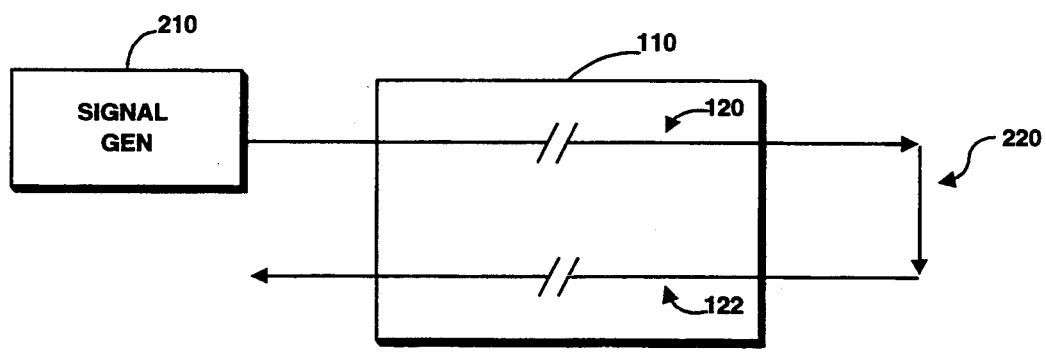
FIG. 2 is a block diagram illustrating a prior art delay measurement technique.
Figure 3:
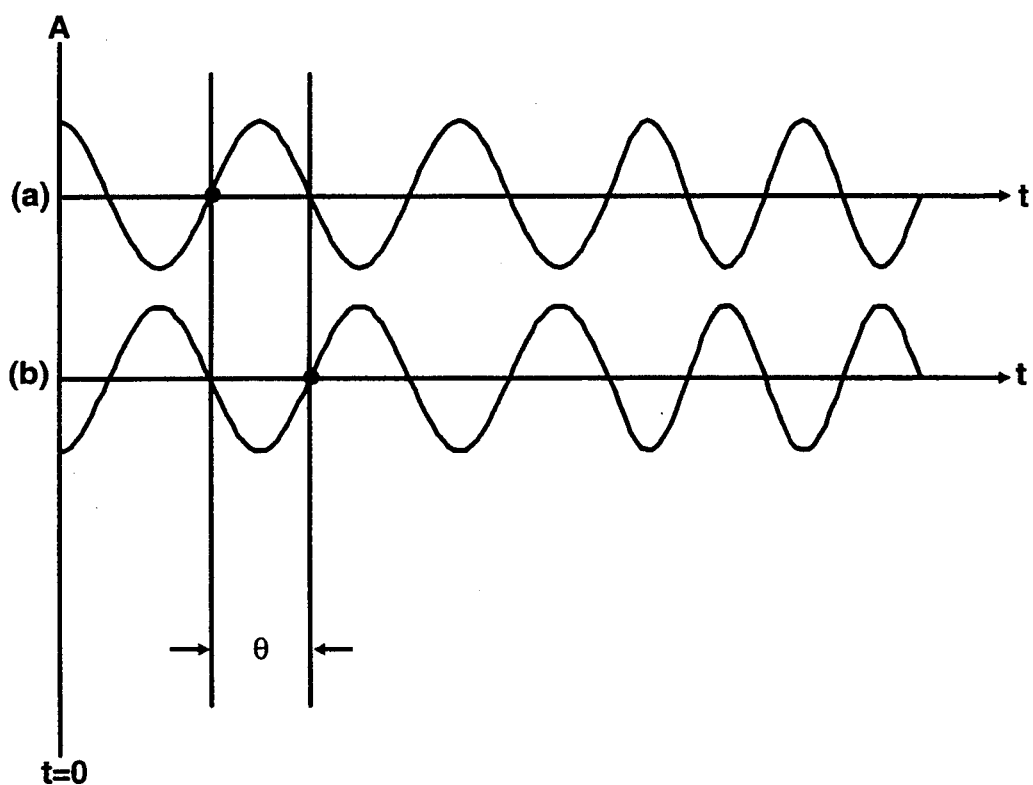
FIG. 3 is a diagram of signals used in a prior delay measurement technique.
Figure 4:
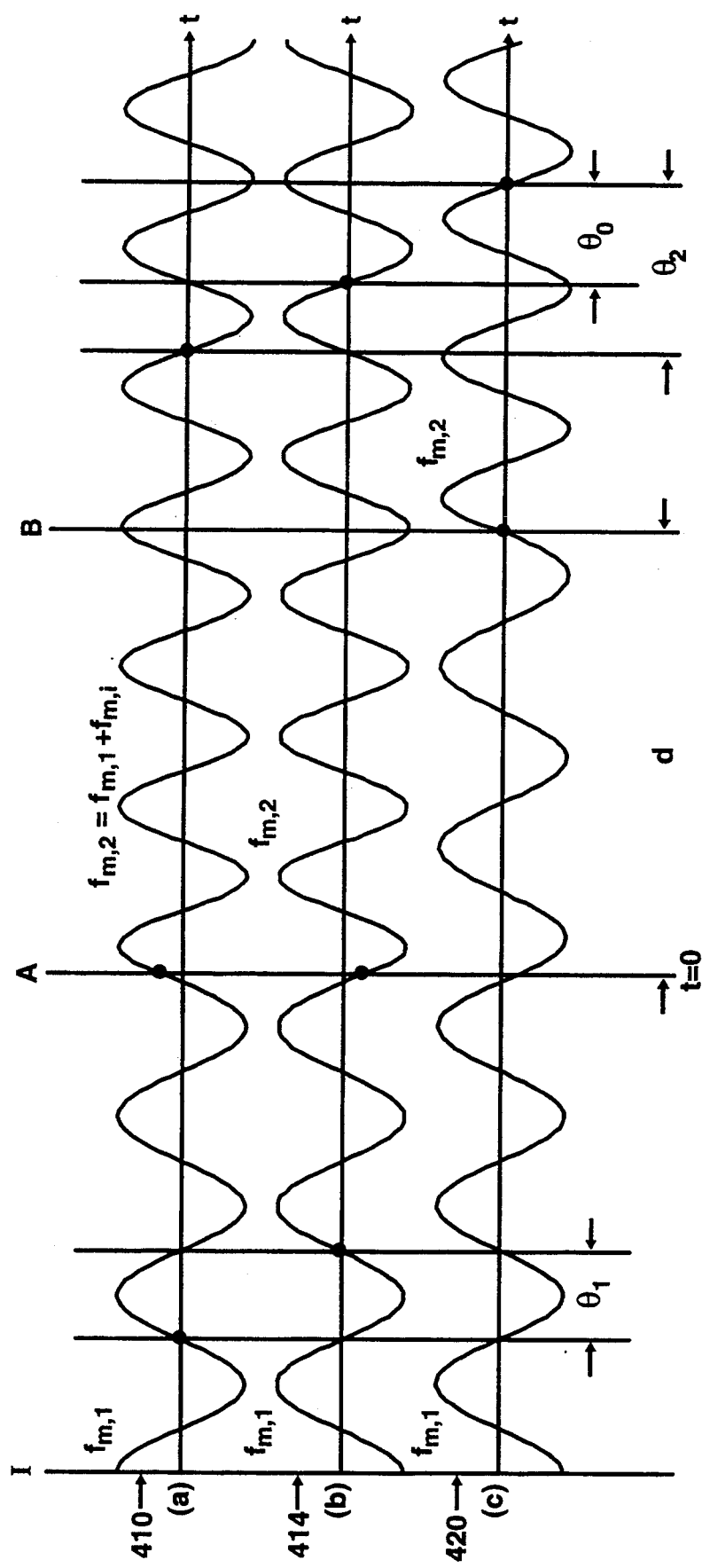
FIG. 4 is a diagram of signals in a delay measurement technique of this invention.

FIG. 4 illustrates a delay measuring technique that measures delays by varying the signal frequency. FIG. 4(a) diagrams a signal 410 transmitted by the network. FIG. 4(b) diagrams reference signal 414 to be described below. FIG. 4(c) diagrams the returned signal 420. We will assume for now that signals 410 and 420 are transmitted base band (not modulated onto a carrier). A similar technique in which the signals are modulated onto a carrier is described below.

Returned signal 420 is delayed by round trip delay d from signal 410. Delay d is determined as described below.

Initially, at point I signals 410 and 420 have the same frequency $f_{m,1}$ which is 83.33 Hz in the example of FIG. 4. Reference signal 414 is generated at the same frequency $f_{m,1}=83.33$ Hz. At point I, reference signal 414 is phase aligned with returned signal 420.

At point A (t=0), the frequency of the transmitted signal 410 is increased by $f_{m,i}=0.833$ Hz to $f_{m,2}=83.33+0.833=84.166$ Hz. The frequency of reference signal 414 is increased simultaneously to $f_{m,2}$. Returned signal 420, however, remains at frequency $f_{m,1}$ for the delay time d. During that time, reference signal 414 is advancing in phase at the rate of $f_{m,i}=0.833$ cycles per second relative to returned signal 420. After the delay d, at point B, the frequency of signal 420 becomes $f_{m,2}$. The phase offset of signal 414 relative to signal 420 becomes a constant value $\theta_o$. Delay d is determined from this offset $\theta_o$ from the following equation:

$$d = \theta_o \omega_i \qquad (1)$$

wherein $\omega_i = f_{m,i} \times 2\pi$ is the radian frequency corresponding to frequency $f_{m,i}$.

Formula (1) can be derived as follows. As is well known, the phase $\phi$ and the radian frequency $\omega$ of a sinusoidal signal satisfy the formula:

$$\phi(t) = \omega t \qquad (2)$$

In particular, between points A and B in FIG. 4, the phase $\phi_{ref}$ of reference signal 414 and the phase $\phi_{ret}$ of returned signal 420 satisfy the following formulas:

$$\phi_{ref}(t) = \omega_2 t \qquad (3)$$

$$\phi_{ret}(t) = \omega_1 t \qquad (4)$$

where $\omega_1$ and $\omega_2$ are the radian frequencies corresponding, respectively, to frequencies $f_{m,1}$ and $f_{m,2}$. Hence the phase offset of reference signal 414 relative to returned signal 420 satisfies the formula:

$$\phi_{ref}(t) - \phi_{ret}(t) = (\omega_2 - \omega_1)t \qquad (5)$$
$$= \omega_i t$$

where $\omega_i = \omega_2 - \omega_1$ is the radian frequency corresponding to frequency $f_{m,i} = f_{m,2} - f_{m,1}$. At point B, t=d. Hence the phase offset $$\theta_0 = \phi_{ref}(d) - \phi_{ret}(d) \qquad (6)$$
$$= \omega_i d$$

Equation (1) easily follows from (6).

The maximum measurable value of phase offset $\theta_o$ is 360° or $2\pi$ radians. Thus the maximum measurable value $d_{max}$ of delay d is $2\pi/\omega_i$. If $\omega_i$ is 0.833 Hz then $d_{max}=1,200$ ms.

Since frequencies $f_{m,1}$ and $f_{m,2}$ are above 83 Hz, the measurement of phase offset $\theta_o$ is fast. Further, phase offsets can be averaged over many cycles for precise measurements and hence delay d can be determined with great precision. Delay resolution of 1 ms is easily obtainable using instrumentation such as used commonly for Envelope Delay Distortion measurements. See, for example, "The ABCs of Fault Locating", Telephone Engineer & Management, Oct. 1, 1981, hereby incorporated by reference herein.

In some embodiments, signal 410 is modulated onto a carrier before transmission. For telephone networks, a typical carrier frequency $f_C$ is between 300 Hz and 3004 Hz. The signal returned by the network is demodulated, and signal 420 is thus recovered.

Figure 5:
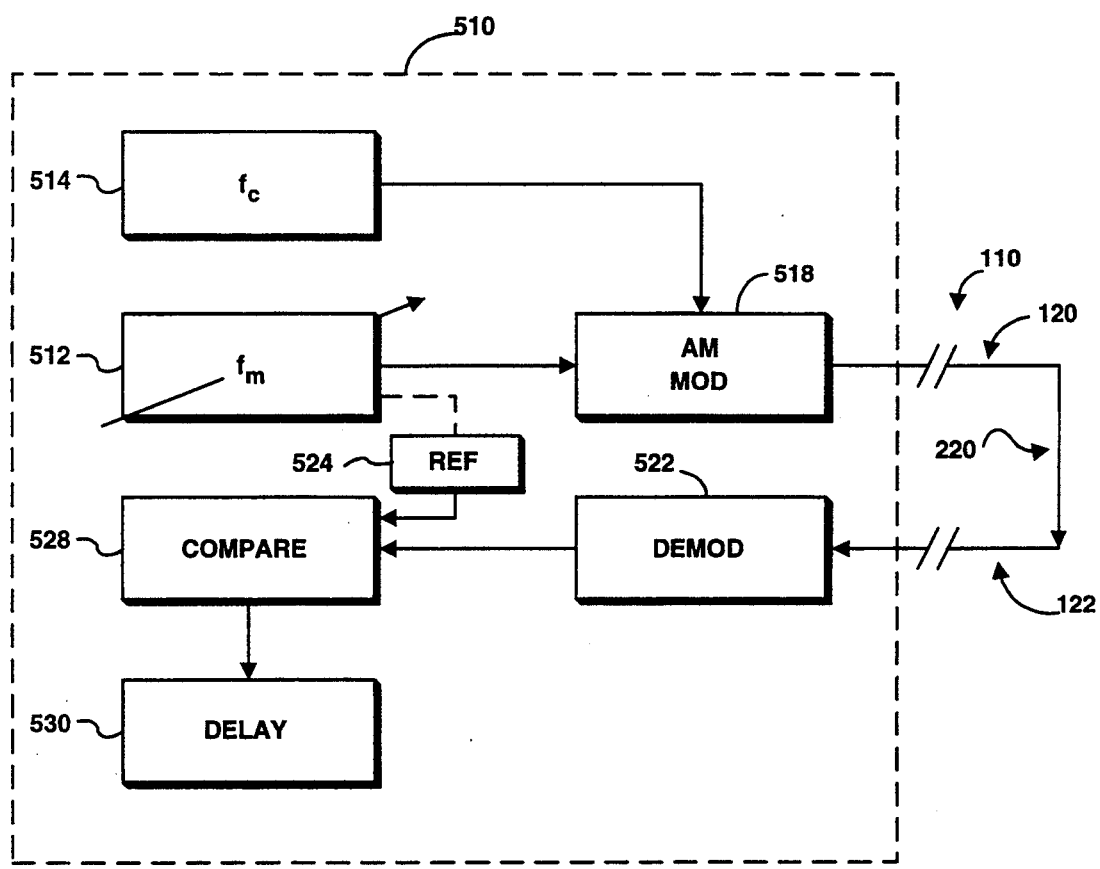
FIG. 5 is a block diagram of a system in which delays are measured according to this invention.

FIG. 5 shows a block diagram of system 510 suitable for measuring round trip delay a of telephone network 110. Signal generator 512 generates signal 410 of frequency $f_m$. Signal generator 514 generates the carrier signal of a fixed frequency $f_C$ between 300 Hz and 3,400 Hz. Amplitude modulator 518 modulates the carrier by signal 410. The modulated signal is transmitted through channel 120 to the other end 220, then looped back and returned through receive channel 122. Demodulator 522 demodulates the returned signal and provides signal 420. Signal generator 524 generates reference signal 414. Phase comparator 528 determines the phase offset $\theta_o$. Circuit 530 computes delay d from $\theta_o$.

In another embodiment, delay d is measured without generating reference signal 414. The phase offset $\theta_o$ is determined by comparing the phases of signals 410 and 420. Namely, between points I and A in FIG. 4, phase offset $\theta_1$ is measured between the phase of transmitted signal 410 and the phase of returned signal 420. Between points A and B, the phase offset increases from $\theta_1$ to $\theta_2=\theta_1+\theta_o$ at the rate of $\omega_i$ radians per second. The phase offset $\theta_2$ is measured after point B. $\theta_o$ is then determined as $\theta_2-\theta_1$. Delay d is then determined from equation (1).

Figure 6:
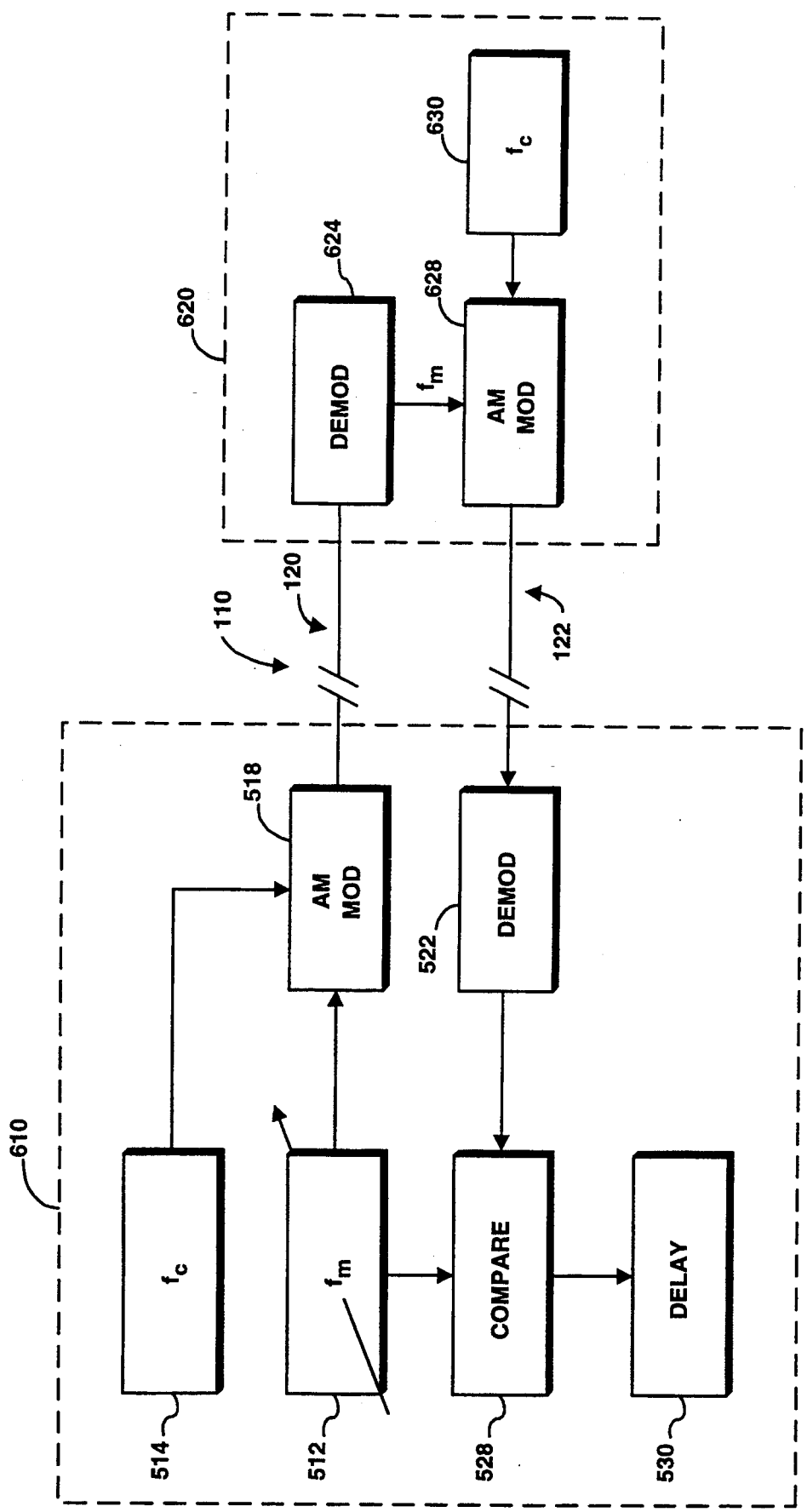
FIG. 6 is another block diagram of a system in which delays are measured according to this invention.

FIG. 6 illustrates system 610 that measures delay d without using reference signal 414. Comparator 528 compares the phase of signal 410 with the phase of signal 420 and determines offsets $\theta_1$ and $\theta_2$ as described above. Circuit 530 then determines $\theta_o$ and delay d.

The system of FIG. 6 has also repeat set 620 at the other end of the network. Repeat set 620 demodulates the signal from transmit channel 120 by demodulator 624. Amplitude modulator 628 remodulates the demodulated signal onto a carrier from signal generator 630. The carrier from signal generator 630 has the same or a different frequency $f_C$ from the carrier from signal generator 514. In one embodiment, the frequency of the carrier from signal generator 514 is 1020 Hz, and the frequency of the carrier from signal generator 630 is 1820 Hz.

Some embodiments of the system of FIG. 5 use repeater set 620 instead of a loop-back. Some embodiments of the system of FIG. 6 use a loop-back instead of repeater set 620.

The system of FIGS. 5 and 6 can be constructed using techniques well known in the art. For example, well-known Envelope Delay Distortion (EDD) measurement systems use similar components in a similar manner. The EDD measurement, however, is fundamentally different from the delay measurement of FIGS. 4–6. Namely, the EDD measurement measures the differential delay across different carrier frequencies $f_C$. In the EDD measurement, the carrier frequencies $f_C$ change, while the modulation frequency $f_m$ remains constant. By contrast, the techniques of FIGS. 4–6 measure the absolute delay. If signals 410 and 420 are modulated onto carriers the carrier frequencies remain constant, while frequency $f_m$ changes.

The maximum differential delay measurable by a typical EDD method is 12 milliseconds when the modulation frequency $f_m = 83.33$ Hz. The 12 ms maximum is adequate for differential delays in many systems, but often inadequate for absolute delay measurements.

While the invention has been illustrated by the embodiments described above, the invention is not limited by these embodiments. In particular, the invention is not limited by specific frequency values. Further, the invention is used to measure delays of circuits other than transmission systems. Other embodiments and variations not described herein are within the scope of the invention, which is defined by the following claims.

What is claimed is:

1. A system for determining a delay of a transmission circuit, said system comprising:
   means for providing a signal S1 to said circuit, the frequency of said signal S1 having alternatively predetermined different values f1 and f2;
   means for recovering said signal S1 after said signal S1 has been transmitted and returned by said circuit, and for providing a recovered signal S2;
   means for generating a reference signal S3 of the frequency equal to the frequency of said signal S1, said signal S3 being phase aligned with said signal S2 when said signal S1 has frequency f1;
   means for determining the phase offset $\theta_o$ between said reference signal S3 and said recovered signal S2; and
   means for determining said delay from the formula
   $$\text{delay} = \theta_o/\omega_i$$
   wherein:
   $$\omega_i = \omega_2 - \omega_1,$$
   $\omega_1$ is the radian frequency corresponding to said frequency f1, and
   $\omega_2$ is the radian frequency corresponding to said frequency f2,
   wherein:
   said means for providing said signal S1 comprises:
   means for generating said signal S1;
   means for generating a carrier signal; and
   means for modulating said signal S1 onto said carrier signal and for providing the modulated signal thus obtained to said transmission circuit; and
   said means for recovering said signal S1 comprises
   means for demodulating the signal returned by said transmission circuit.

2. A system for determining a delay of a transmission circuit, said system comprising:
   means for providing a signal S1 to said circuit, the frequency of said signal S1 having alternatively predetermined different values f1 and f2;
   means for recovering said signal S1 after said signal S1 has been transmitted and returned by said circuit, and for providing a recovered signal S2;
   means for determining the phase offset $\theta_1$ between said signal S1 and said signal S2 when said signals S1 and S2 have frequency f1, and for determining the phase offset $\theta_2$ between said signal S1 and said signal S2 when said signals S1 and S2 have frequency f2; and
   means for determining said delay from the formula:
   $$\text{delay} = (\theta_2 - \theta_1)/\omega_i$$
   wherein:
   $$\omega_i = \omega_2 - \omega_1,$$
   $\omega_1$ is the radian frequency corresponding to said frequency f1, and
   $\omega_2$ is the radian frequency corresponding to said frequency f2,
   wherein:
   said means for providing a signal S1 comprises:
   means for generating said signal S1;
   means for generating a carrier signal; and
   means for modulating said signal S1 onto said carrier signal and for providing the modulated signal thus obtained to said transmission circuit; and
   said means for recovering said signal S1 comprises
   means for demodulating the signal returned by said transmission circuit.

3. The system of claim 2 wherein said means for providing a signal S1 comprises means for changing the frequency of said signal S1 from f1 to f2 with phase continuity.

4. The system of claim 1 wherein $\omega_i$ is smaller than $\omega_1$ and is smaller than $\omega_2$.

5. The system of claim 1 wherein the means for modulating said signal S1 comprises an amplitude modulator for modulating the signal S1.

6. The system of claim 2 wherein $\omega_i$ is smaller than $\omega_1$ and is smaller than $\omega_2$.

7. The system of claim 2 wherein the means for modulating the signal S1 comprises an amplitude modulator for modulating the signal S1.

* * * * *

UNITED STATES PATENT AND TRADEMARK OFFICE
CERTIFICATE OF CORRECTION

PATENT NO.    :   5,397,992
DATED         :   March 14, 1995
INVENTOR(S)   :   S. Randolph Hill It is certified that error appears in the above-identified patent and that said Letters Patent is hereby corrected as shown below:

```
Column 4, line 27
     delete "a" and insert --d--.
```

Signed and Sealed this

Eighteenth Day of June, 1996

Attest:

BRUCE LEHMAN

Attesting Officer                    Commissioner of Patents and Trademarks